(12) United States Patent
Isely et al.

(10) Patent No.: US 12,365,458 B2
(45) Date of Patent: Jul. 22, 2025

(54) MUNITIONS PAYLOAD DELIVERY SYSTEM WITH BUMP FIRE AND RADIO COMMAND TRIGGERS

(71) Applicant: Cyberlux Corporation, Research Triangle Park, NC (US)

(72) Inventors: Larson Isely, Carolina Shores, NC (US); Mark Schmidt, Pittsboro, NC (US); Neill Whiteley, Montgomery, TX (US); Phillip Richard Tucker, Spring, TX (US); Paul Nurkkala, Indianapolis, IN (US); Aaron Goodman, Waccabuc, NY (US); Alan Woltemath, Spring, TX (US)

( * ) Notice: Subject to any disclaimer, the term of this patent is extended or adjusted under 35 U.S.C. 154(b) by 193 days.

(21) Appl. No.: 18/348,548

(22) Filed: Jul. 7, 2023

(65) Prior Publication Data

US 2025/0145289 A1    May 8, 2025

Related U.S. Application Data

(60) Provisional application No. 63/359,807, filed on Jul. 9, 2022.

(51) Int. Cl.
| | |
|---|---|
| *B64D 1/06* | (2006.01) |
| *B64U 60/50* | (2023.01) |
| *F42B 12/32* | (2006.01) |
| *F42C 15/42* | (2006.01) |
| *B64U 101/18* | (2023.01) |

(52) U.S. Cl.
CPC ............... *B64D 1/06* (2013.01); *B64U 60/50* (2023.01); *F42B 12/32* (2013.01); *F42C 15/42* (2013.01); *B64U 2101/18* (2023.01)

(58) Field of Classification Search
CPC ...... B64D 1/06; B64U 60/50; B64U 2101/18; F42B 12/32; F42C 15/42
USPC ......................................................... 89/1.55
See application file for complete search history.

(56) References Cited

U.S. PATENT DOCUMENTS

| | | | | |
|---|---|---|---|---|
| 11,609,073 | B2 * | 3/2023 | Treadway | ............... F42B 12/60 |
| 2019/0387734 | A1 * | 12/2019 | Sullivan | ................ A01M 29/16 |
| 2025/0012550 | A1 * | 1/2025 | Porter | ..................... F42B 25/00 |
| 2025/0058873 | A1 * | 2/2025 | Tan | ......................... B64D 1/06 |

FOREIGN PATENT DOCUMENTS

WO    WO-2021046592 A1 *  3/2021  ............. B64C 27/22

* cited by examiner

*Primary Examiner* — Samir Abdosh

(57) ABSTRACT

A Munitions Payload Delivery System (MPDS) is provided. One embodiment of the MPDS comprises a multi-rotor drone configured to carry a munition in the form of a HEDP linear-shaped charge or Armor Piercing munition or other-shaped munition. The drone, in one embodiment, includes a camera that provides a remote operator with a real-time video feed so the operator can pilot the drone to a specific target on a battlefield. Once a target is selected, the operator ignites the munition by flying the drone into the target, landing the drone on the target, or activating a radio fire button. In one embodiment, each of these mechanisms closes a switch on board the drone connecting a voltage to a blasting cap inside the payload.

19 Claims, 9 Drawing Sheets

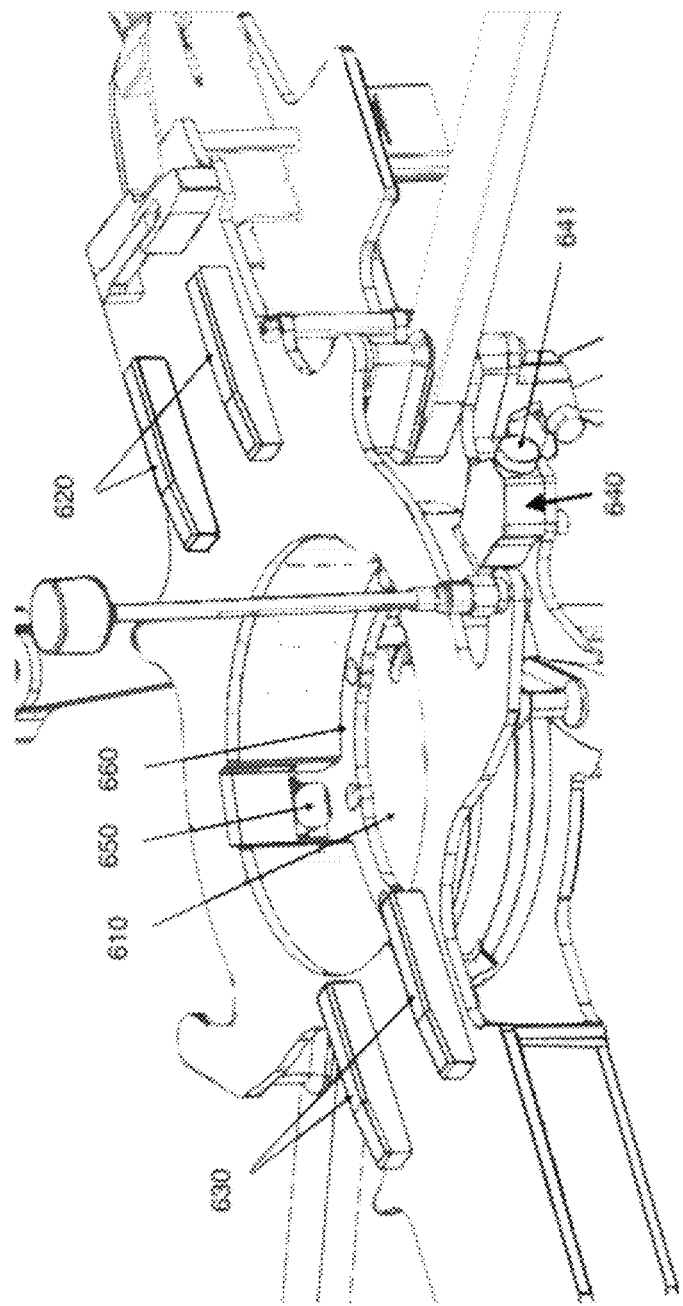

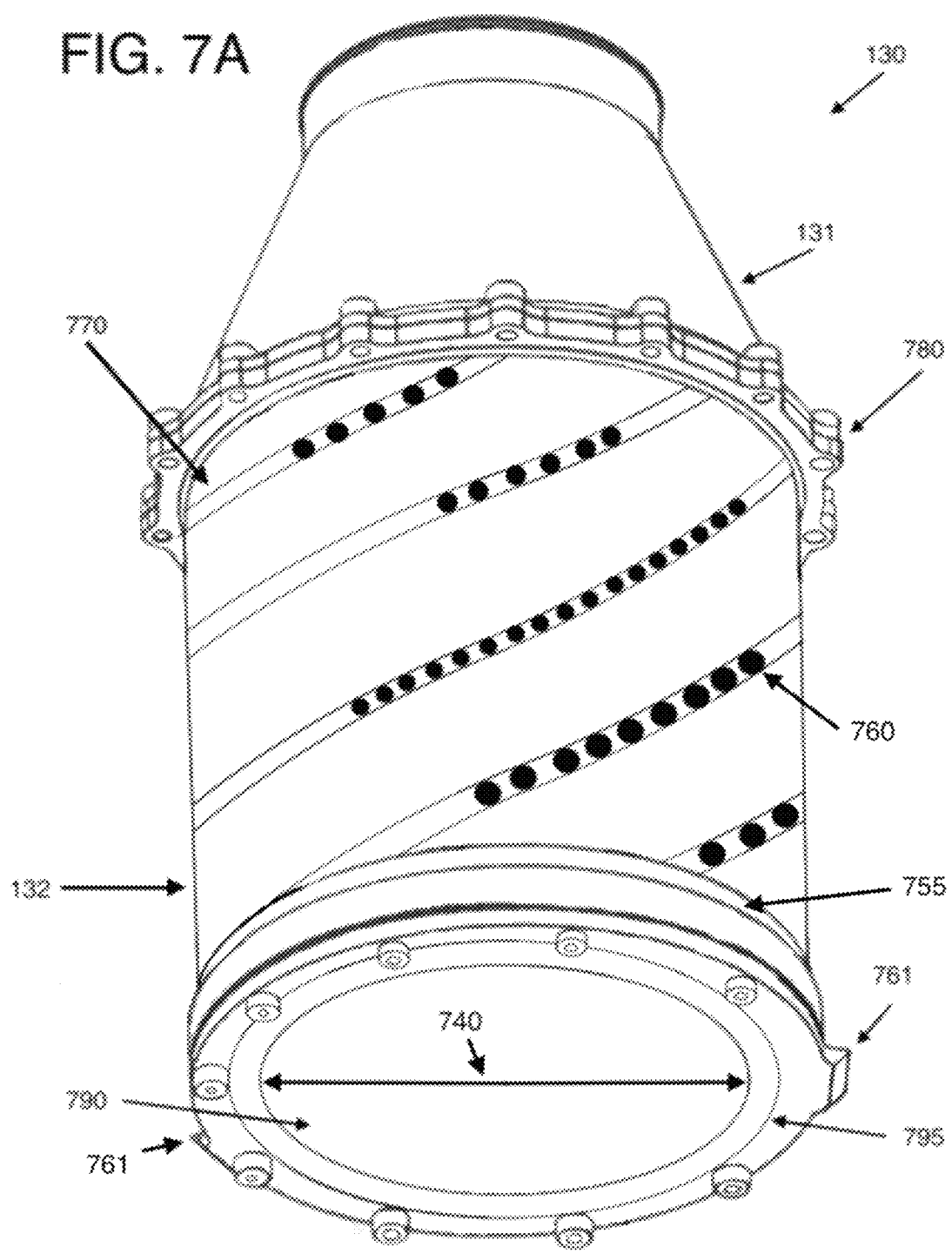

MUNITIONS PAYLOAD DELIVERY SYSTEM WITH BUMP FIRE AND RADIO COMMAND TRIGGERS

CROSS-REFERENCE TO RELATED APPLICATIONS

This application claims the benefit of U.S. provisional patent application Ser. No. 63/359,807 filed Jul. 9, 2022.

TECHNICAL FIELD OF INVENTION

The present invention relates to multi-rotor drone technology and, in particular, to single-use (or substantially single-use) drones configured as a munitions payload delivery system principally for targeting armored vehicles.

BACKGROUND OF THE INVENTION

The U.S. military has used drone technology for many years. Applications include intelligence, surveillance, target acquisition, reconnaissance, and delivery of munitions, such as missiles, anti-tank and anti-armor weaponry, and bombs. One example is the Switchblade 300. Designed to help U.S. troops quickly respond to enemy ambushes when close air support is too far away, the hand-carried unmanned aerial vehicle (UAV) uses sensors to spot enemy fighters and explosives to engage them in battle. The Switchblade 600 is the anti-armor variant of the Switchblade 300 and is designed to take out armored vehicles.

But the Switchblade 300 & 600 systems are fixed-wing and lack the maneuverability of multi-rotor drones, which can stop and hover quietly in the air before attacking. It also lacks First-Person Viewpoint (FPV), i.e., an onboard camera that allows an operator to pilot the drone remotely and from the point of view of the drone so that the pilot can remain a safe distance away while attacking a target seen on the video feed. Switchblade systems are also regulated as weapons-grade systems, greatly complicating the ability to import and export the systems to and from different countries, due to regulatory laws.

Another system available to soldiers in the field is the Javelin, an anti-tank, anti-armor missile that is hand-carried and shoulder-fired. Javelins, however, have no capability to guide the missile to a particular weak point on an armored vehicle and, therefore, typically engages the full armor. It is also a single-use weapon that is very expensive to manufacture and is regulated as a weapons-grade system, as well.

Another problem for soldiers in the field is that many weapons systems available to them for quick strike have too short a range. This places soldiers in a critically dangerous position while attacking a tank that can aim and strike a target approximately 3 miles away. Many short-range weapons, such as rocket-propelled grenades (RPGs), shoulder-fired missiles, or laser-guided shoulder-fired missiles, must have operators who fire them from within eyesight of the target, which is typically well within the range of a tank. Once the short-range weapon is fired, the soldier's position is exposed to the enemy and any enemy tank within 3 miles can target the soldier. It is desirable to have an accurate, efficient weapon system that is light, portable, and can be hand-carried and operated in the field to safely engage armed military vehicles from a safe distance with little or no consequence.

Moreover, what would be helpful is a system that is much less expensive than existing systems, has the maneuverability of multi-rotor drones, allows for combined reconnaissance and weapons delivery, and can engage soft spots on heavily armored military vehicles, such as a tank, from a safe distance away without complicated, dangerous, and/or expensive guidance systems.

Further, it is desirable to have a low-cost, maneuverable weapons delivery system that separates the weapons-grade explosives from the system that delivers it on the battlefield so that the delivery system is not categorized as a weapons system. This reduces the regulatory complexities that often arise from importation and exportation of the delivery system across national boundaries. The delivery system may be further configured to facilitate the armament of the system with weapons-grade explosives while in the battlefield. This and other advantages may be obtained by one or more of the embodiments of the invention described herein.

SUMMARY OF THE INVENTION

It is an object of at least one embodiment of the invention to overcome one or more of the limitations of the prior art discussed above by providing a multi-rotor, unmanned aerial vehicle (UAV), or drone, configured with field-selectable payloads, such as High Explosive Dual Purpose (HEDP) munitions, Armor Piercing (AP) munitions, and/or any light-weight munitions known in the art. The drone can be further configured with a camera and a set of goggles to be used by the soldier to pilot the drone in First Person Viewpoint (FPV), i.e., from the viewpoint of the drone's onboard camera. This allows the soldier to pilot the drone from a safe distance away from the battlefield and attack a target that comes into view of the camera's video feed.

The video feed further allows the pilot to select a particular target in the battlefield, such as a tank, in real time and select a particularly vulnerable point on the target to discharge the explosives contained in the munitions payload delivery system. The particular point may be a weak point in the armor of the vehicle, such as a hatch, thus allowing smaller and lighter-weight explosives to render a larger and heavier armored vehicle inoperable.

In another embodiment, the drone may come prefigured with a payload container that is readily fillable by soldiers in the field with weapons-grade explosives, such as Semtex or U.S. M112 (C-4), thus separating the munitions payload delivery system (the drone) from the explosives until equipped in the battlefield. The payload container may take on any shape, including the shape of a HEDP linear-shaped charge, and include a copper metal plate or other metal or fragmentary material already formed on the payload container ready to be exploded. The container may come prefigured with a hole or other receptacle for placing a blasting cap, therein, such as an U.S. Army M6 blasting cap. In one embodiment, the drone is capable of being operated at a safe distance from the battlefield, such as 3.4 miles away from a line of tanks, with little FPV latency (e.g., less than 20 msec).

In one embodiment, the drone may have up to 8 rotors for carrying a payload up to 5 pounds. Payloads can include both a shaped charge and a wide area fragmentation pattern charge for maximum damage.

In one or more embodiments, discharge of the explosives can be by the pilot using a radio fire button for transmitting a signal to the drone that causes one or more blasting caps in the payload container to ignite, or by manually engaging a "bump-fire" mechanism attached to the payload container of the drone or to the drone's frame. One example of a "bump-fire" mechanism is a rod that protrudes outwards beyond the drone's rotors or above or below the drone's frame. When the drone collides with a target, the bump-rod engages the target first, being extended outwards beyond the rotors and/or frame of the drone, and causes a switch within the payload container or on the drone's frame to close and activate a blasting cap typically within the payload container. The length of the rod produces a "standoff" distance between the drone and the target that allows the explosives to ignite and accelerate the copper and/or other metal material within the payload to achieve a maximum velocity before striking the target to, thereby, do maximum damage to the target, the bump-rod having struck the target first to achieve the "standoff" distance.

In another embodiment, the "bump-fire" mechanism is positioned vertically with respect to the drone so that when the drone descends and lands on a target, the bump-fire mechanism activates to cause the explosion.

In another embodiment, the "bump-fire" mechanism is positioned horizontally with respect to the drone so that when the drone collides with a target while moving forward, the "bump-fire" mechanism activates to cause the explosion.

In another embodiment, the payload container is entirely or partially made of metal or copper that fragments upon explosion and may be made in the form of a shaped charge. It further may contain an empty cavity for filling the explosive material in the field. The container may be configured to open and close easily and rapidly for filling explosive materials. The container may further include the blasting cap already contained therein or inserted later through a pre-made hole in the container.

In still another embodiment, the payload container may be made of a thermoplastic or a plastic material, including a 3-D printed plastic or thermoplastic material. The payload container may have an inner and outer casing made of such plastic or thermoplastic material, and another plastic or thermoplastic material may be formed in between the inner and outer casing. A space may then be configured in the material between the inner and outer casings. The space may be used to house ball bearings or other material (usually made of steel) that can act as projectiles when the explosive material inside payload container ignites. The projectiles may be in addition to the copper or other metal plating formed into the shaped charge in order to provide additional explosive capacity of the payload container.

In still another embodiment, the space configured in between the inner and outer casings may take the shape of a helix or corkscrew, or any other shape, so as to control the number and placement of ball bearings (or other projectiles) surrounding the explosive material. Completely filling an empty space between the inner and outer casings of a payload container may add too much weight for a specific-sized drone to lift and carry to a target on a battlefield. By forming a configured space, such as a helical or other space of a particular size and shape, that spirals around the payload container uniformly, for example, allows the user to control how much projectile material is added to the payload container and its placement around the explosive material.

These and other embodiments will be described herein.

BRIEF DESCRIPTION OF THE DRAWINGS

FIG. 6 illustrates an exemplary embodiment of a drone frame having space and connections for easy attachment of a cylindrical payload container.

FIG. 7A illustrates a side view of an exemplary embodiment of a generally cylindrical payload container having a helical or spiral space configured between an inner and outer casing of the payload container.

FIG. 9 illustrates another exemplary embodiment of a generally cylindrically-shaped payload container having a helical or spiral space configured between an inner and outer casing and, further, having square-shaped steel projectiles filled there-in.

DETAILED DESCRIPTION OF THE INVENTION

In the following description, and for the purposes of explanation, numerous specific details are set forth in order to provide an understanding of the various aspects of the invention. It will be understood by those skilled in the relevant arts that the present invention may be practiced without these specific details. In other instances, known structures and devices are shown or discussed more generally in order to avoid obscuring the invention. In many cases, a description of the operation is sufficient to enable one to implement the various forms of the invention. It should be noted that there are many different and alternative configurations, devices and technologies to which the disclosed inventions may be applied. The full scope of the inventions is not limited to the examples that are described below.

Figure 1:
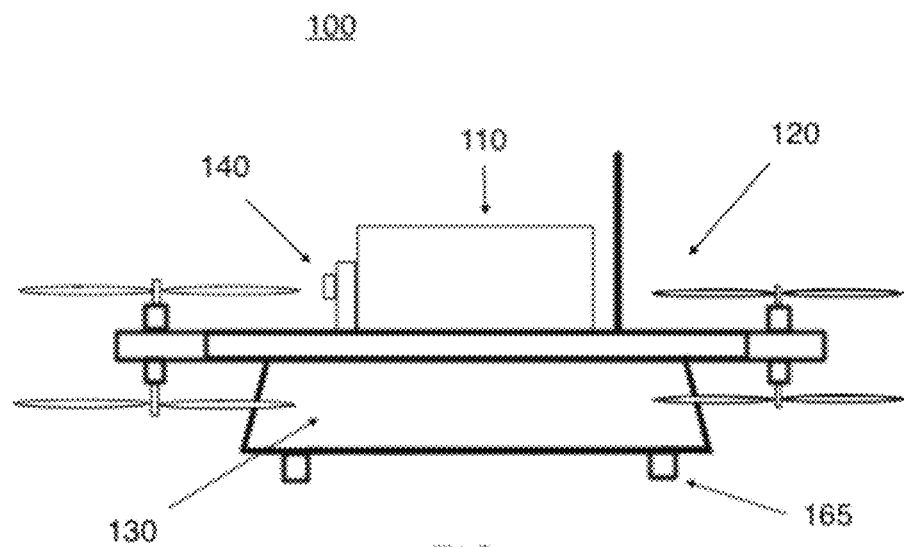
FIG. 1 is an exemplary embodiment of a munitions payload delivery system.

FIG. 1 shows an exemplary embodiment of a munitions payload delivery system 100 according to one aspect of the invention. In one embodiment, the delivery system 100 contains three basic components: a battery 110, a multi-rotor drone 120, and a payload container 130. The drone 120 can be, for example, a flying device that can be flown using a remote controller. The drone 120 can be, in one embodiment, a commercial drone configured to carry a payload weighing up to 5 pounds, for example, though bigger and more powerful drones can be configured to carry more. Examples of such drones are the class known as the Money Shot Cinema drones, model numbers CM01750 and CM01980, offered for sale by Cyberlux Corp., 800 Park Offices Drive, Suite 3209, Research Triangle Park, NC 27709. These drones are capable of lifting and carrying Cinematic cameras weighing up to 6 pounds and are easily modified to carry the payload container 130 described herein.

Features of these drones may include the battery 110 and a camera, such as camera 140 of FIG. 1. Camera 140 can be used to pilot drone 120 through use of First Person Viewpoint (FPV) goggles (not shown), or DJI FPV goggles (not shown). FPV goggles and DJI FPV goggles are well known in the art and are commonly used to pilot drones by providing the pilot with a video feed taken from the drone's camera 140. In one embodiment, camera 140 is not gimbaled and is set preferably at a ten-degree angle upwards from the horizon when the drone is sitting level on the ground. This allows the drone to pitch ten-degrees downwards when moving forward in the air, giving the pilot a level perspective with respect to the video feed.

Battery 110 can be any known battery used by the class of drones mentioned above or can be, for example, a lithium-ion battery having a 12,000 mah capacity or more. One such battery is LiPo 12000XL 6S2P 22.2 v sold by MaxAmps, 4019 E. Central Ave., Spokane, WA 99217. Multiple batteries can be attached and used together in the manner according to the art for longer flight time. The battery 110 may be attached to the top of drone 120 and the payload container 130 to the bottom, or vice versa. Payload container 130 may take on different configurations to facilitate the mounting, the blast pattern, and the activation of the blasting cap using, for example, a bump-rod, to be discussed in more detail below.

Figure 2:
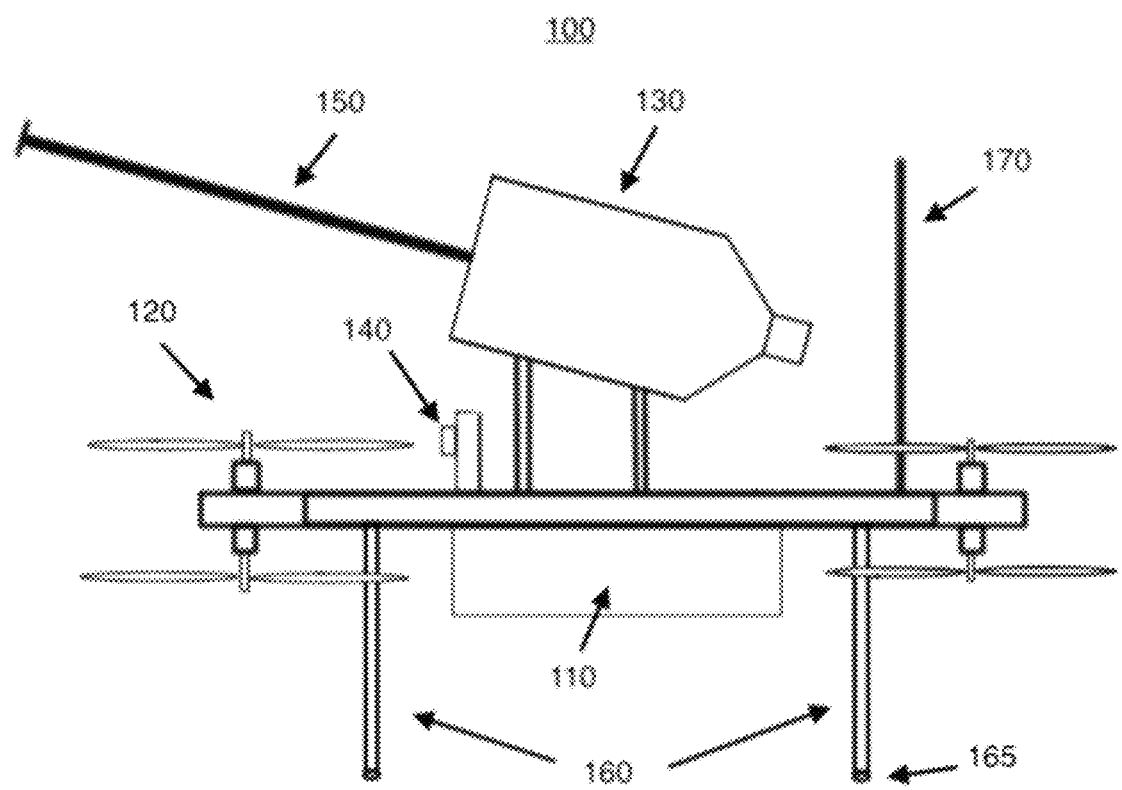
FIG. 2 is a second exemplary embodiment of a munitions payload delivery system.

FIG. 2 shows another embodiment of the munitions payload delivery system 100 according to another aspect of the invention. In FIG. 2, payload container 130 is a canister-shaped container and includes a bump-rod (also called a bump-fire rod) 150 installed therein. By design, bump-rod 150 extends outwards beyond the rotating propellers, as shown. In one embodiment, the bump-rod 150 and payload container 130 is preferably set at a ten-degree angle upwards from the horizon, as shown in FIG. 2, when the drone is sitting level to the ground. This allows the drone to pitch ten-degrees downwards when moving horizontally forward in the air, allowing bump-rod 150 to engage a target that is level to its flight path. When the pilot of drone 120 flies horizontally into an armored target, bump-rod 150 collides with the target first, the bump-rod 150 being extended beyond the drone 120, and is pushed back inside canister 130, triggering a blasting cap and a subsequent explosion from, for example, plastic explosives inside canister 130. The length of bump-rod 150 is determined by the standoff distance needed for the explosion within payload container 130 to take place and cause any fragmented particles to accelerate to a maximum velocity, such as 16,000 feet/sec, for maximum damage to the target before drone 120 collides with the target. A shorter bump-rod 150 may not allow enough time for the fragmented particles to reach maximum velocity before drone 120 collides with the target.

In one embodiment, payload container 130 contains High Explosive Dual Purpose (HEDP) munitions. In another embodiment, payload container 130 contains armor piercing (AP) munitions. In still another embodiment, payload container 130 attaches to drone 120 at an angle facing vertically downwards towards the ground so that if drone 120 lands on top of a target, bump-rod 150 will compress and activate a blasting cap in the manner discussed above.

In still another embodiment, one or more of the landing feet 165 on landing gear 160 of drone 120 can be configured as a downward facing bump-rod 150 to trigger the blasting cap. Alternatively, the legs of landing gear 160 may be configured as individual bump-rods 150. Preferably, two opposing legs or feet of drone 120 are configured as bump-rods 150. In this embodiment, the length of the legs 160 connected to the drone's feet 165 may determine the standoff distance, though the standoff distance may be determined by other means.

In another embodiment, the pilot's remote control for piloting drone 120 includes a button or switch configured to activate one or more blasting caps inside payload container 130 through radio control means. A radio control means may send an RF signal to drone 120 to open or close a radio controlled switch inside delivery system 100 to activate one or more blasting caps.

Figure 3:
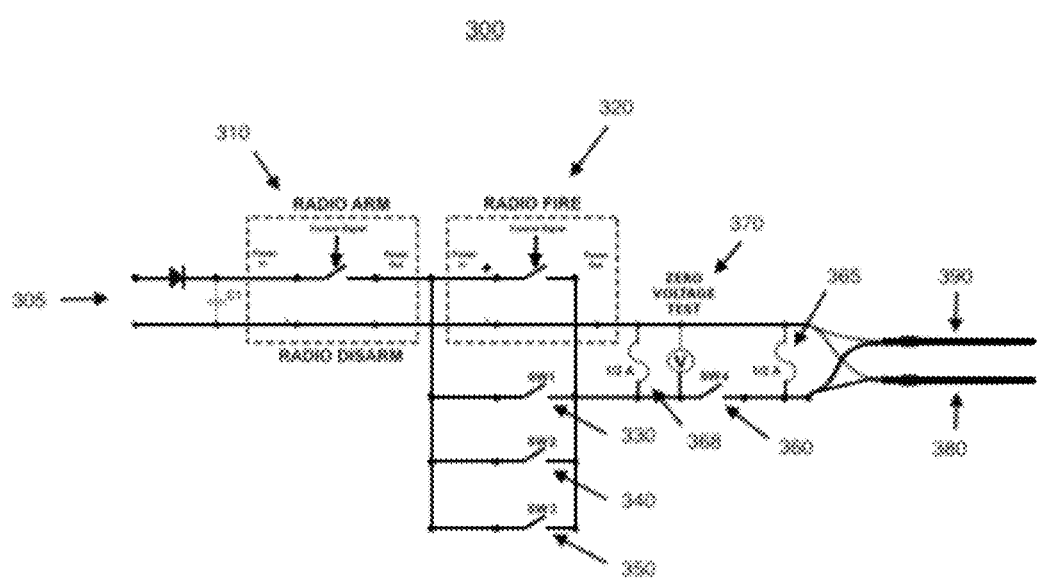
FIG. 3 illustrates an exemplary control circuit for controlling application of a blasting signal sent to blasting caps that are a part of a munitions payload delivery system.

FIG. 3 shows an exemplary embodiment of a control circuit 300 for controlling activation of blasting caps 380 and 390 inside payload container 130. Control circuit 300 includes a number of switches. Switches 310 and 360 are included for safety and are referred to as radio arm (or radio disarm) 310 and manual arm (or manual disarm) 360, respectively. Before blasting caps 380 and 390 can be triggered, both radio arm 310 and manual arm 360 switches must be closed. Radio arm 310 can only be closed by radio control from the pilot once delivery system 100 has been powered up and the pilot sends the radio control signal to drone 120 using the drone's remote controls. Radio controlled switches are well known in the art. For example, ElecHawk produces and sells a number of radio control switches, including its RC Remote Controlled AUX on/Off Electronic Switch Relay for Light Drone.

In addition to radio arm 310, control circuit 300 may include a manual arming switch 360 that prevents any signal from propagating to blasting caps 380 and 390 until the user is ready to use delivery system 100. As shown, control circuit 300 includes a safety check, i.e., a set of terminals 370 (zero voltage test) for checking whether the leads connected to blasting caps 380 and 390 have power applied to them or not. If power is present, closing manual arm switch 360 could activate the blasting caps 380 and 390 and cause severe, unintended injury or death to the user of the delivery system 100. If no power is present, manual arm switch 360 may safely be closed, and delivery system 100 is one step closer to being armed.

Once delivery system 100 is in flight towards the battlefield, the pilot may cause a radio signal to be sent to delivery system 100 to close radio arm switch 310. After the pilot sends the RF signal to close radio arm switch 310, delivery system 100 is armed and ready to be used as a weapons system. The combination of radio arm 310 and manual arm 360 prevents accidental activation of blasting caps 380 and 390 until delivery system 100 is in the air and a safe distance from the pilot.

At that point, the closing of any of the switches 320 to 350 may activate blasting caps 380 and 390 and cause the munitions inside payload container 130 to explode.

Switch 320 is a radio fire switch. The pilot of delivery system 100 may use the video feed from camera 140 to locate a target on the battlefield. Upon nearing the target, the pilot can press a button or flip a switch on his or her remote controller for delivery system 100 to send a radio signal to close radio fire switch 320. Once the switch closes, power supplied to input circuit 305 from battery 110 reaches fuses 365 and 368, causing the fuses to open and allow a power signal to subsequently activate blasting caps 380 and 390.

Alternatively, control circuit 300 has three additional switches, 330-350, each connected to a bump-fire assembly (not shown), such as bump-rod 150. As discussed above, when the pilot flies delivery system 100 into a target horizontally, bump-rod 150 of FIG. 2 is configured to collide with the target first. When bump-rod 150 collides with the target, the bump-rod is pushed backwards into payload container 130 (FIG. 2) and closes or causes to be closed one of switches, 330-350, whichever switch it is connected. Once the respective switch closes, control circuit 300 triggers blasting caps 380 and 390, as discussed above, and causes the munitions inside canister 130 to explode.

In one embodiment, switches 330 and 340 attach to a vertically configured bump-fire assembly, such as two of the legs 160 or feet 165 of delivery system 100, and switch 350 attaches to a horizontally configured bump-fire assembly, such as bump-rod 150 of FIG. 2. In this way, the pilot has the option of triggering blasting caps 380 and 390 by landing delivery system 100 on top of a target or by flying horizontally into the target and colliding with it. Of course, in one embodiment, the pilot always has a radio fire button option via the radio fire switch 320 that he or she could utilize at anytime.

Figure 4:
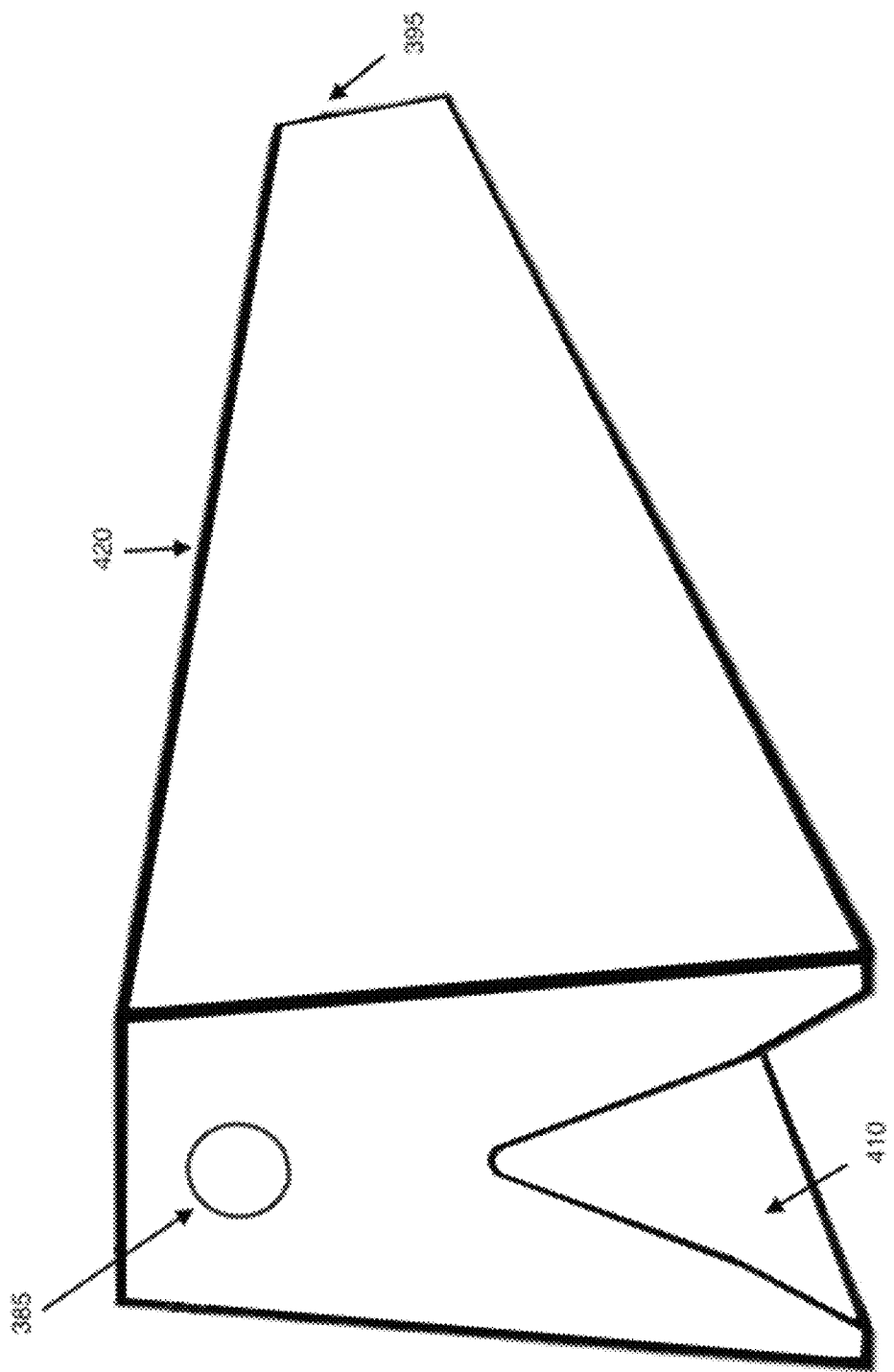
FIG. 4 illustrates a first perspective view of an exemplary embodiment of a linear-shaped payload container of a munitions payload delivery system.
Figure 5:
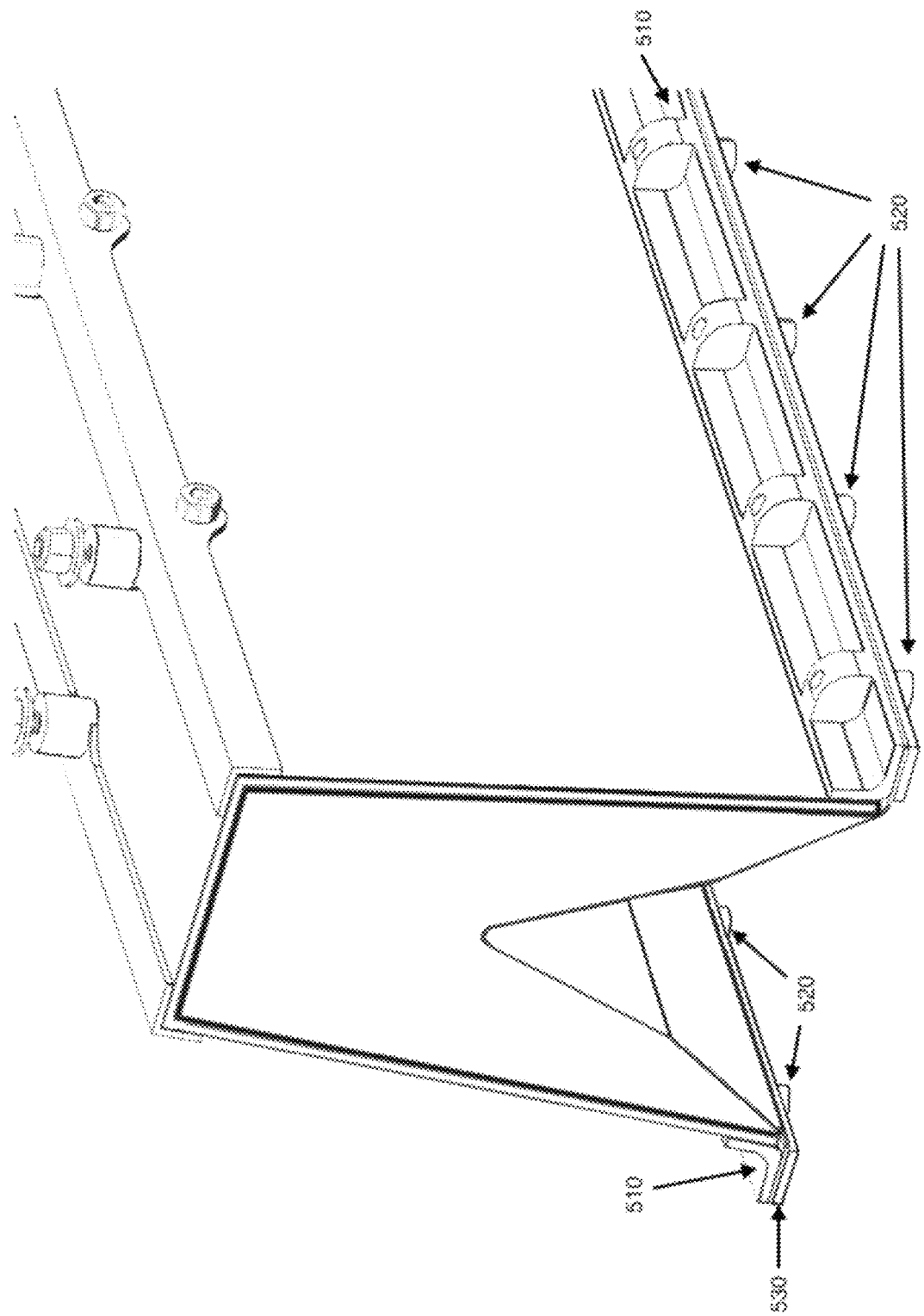
FIG. 5 illustrates a second perspective view of an exemplary embodiment of a linear-shaped payload container of a munitions payload delivery system.

FIG. 4 and FIG. 5 show two perspective views of payload container 130 configured to house a HEDP linear shaped charge. Payload container 130 may contain a copper metal plate 410 designed in the shape of the charge. In a pre-battlefield condition, the inside of payload container 130 may be empty, ready to be filled with an explosive material, such as Semtex or M112. As shown in FIG. 5, the copper metal plate 410 (FIG. 4) of payload container 130 is flanged at the bottom and encloses the inside of payload container 130 when fixed into position by screws or other fasteners 520 via angle bracket 510 and support bracket 530. Payload container 130 is configured to be opened by screws or other fasteners 520 and filled with an explosive material in the field by a soldier or pilot. In this manner, the explosive material may be handled separately from the delivery system 100 until the delivery system 100 reaches, for example, the battlefield. Once on a battlefield, payload container 130 may be configured with explosive material.

Also shown in FIG. 4 is housing material 420. Housing material 420 can be entirely or partially made of metal or copper that fragments upon explosion. The configuration of the housing may be formed into a shaped charge. One or more blasting caps 380 and 390 (FIG. 3) may be inserted into orifices 385 and 395 (FIG. 4) and connected to switches in control circuit 300 (FIG. 3), as described above.

While FIG. 4 and FIG. 5 illustrate one example of a loadable payload container 130, payload container 130 is not limited to this configuration and may take the form of any configuration, including the canister 130 shown in FIG. 2.

FIG. 6 illustrates one embodiment of a drone 600 having a cylindrically configured space 610 and connections (640 (inside view of latch) and 650 (outside view of latch housing)) for easy attachment of a payload container 130 to the drone's frame 600. Frame 600 includes a spring-loaded latch bolt 640 having one surface angled, like the spring-loaded latch bolt of a typical door on a house. When inserting payload container 130 of FIG. 7A into opening 610 of drone 600, for example, the bottom part of payload container 130 pushes spring-loaded latch bolt 640 into its recess to make room for the payload container 130 to fit inside opening 610. Once payload container 130 slips past latch bolt 640, a cylindrical recess 755 (FIG. 7A) of payload container 130 comes into contact with latch bolt 640, allowing latch bolt 640 to snap back into its original position or near original position and holds payload container 130 firmly in place on drone frame 600. A second latch bolt assembly 650 and a third latch bolt assembly 650 may accompany latch bolt 640 to hold payload container 130 in place once installed onto drone frame 600. Any number of latch bolt assemblies may be position around opening 610, in like manner. Latch bolt assembly 640 may include a knob 641 to adjust the latch to fit different-sized payload container 130. Latch bolt 650 may comprise latch bolt assembly 640. Regardless, any form of quick attachment may be used and the quick attachment mechanisms (640 & 650) described herein are only exemplary.

Drone 600 also contains two sets of battery brackets (620 & 630) for holding two battery packs (not shown) for powering drone 600 as it operates. The position of battery brackets (620 & 630) may be selected along a front-to-back and a left-to-right center axis of drone 600 to balance the weight equally on each side of drone 600. Splitting a single battery pack into two batteries may allow more flexibility when balancing the overall weight of a payload system across the central axes of the drones.

Drone 600 also contains a cylindrical bracket 660 on top of which payload container 130 rests after payload container 130 is inserted into opening 610. Once inserted, latch bolts 640 and 650 firmly hold payload container 130 into place against bracket 660 while drone 600 is in operation.

Referring to FIG. 7A, payload container 130, in one embodiment, comprises at least two parts: blasting cap container 131, configured to hold a blasting cap, and shaped-charge canister 132, configured to hold explosive material, such as Semtex or M112 (C4). Payload container 130 also comprises the copper cone 790, fully illustrated in FIG. 8. Copper cone 790 may be made of other material, including other metal material. When an explosive material inside shaped-charge canister 132 ignites, the blast fragments copper cone 790 into pieces, each of which preferably accelerates to a desired speed before striking a target, as described above. Preferably, the blast also causes canister 132 to fragment radially, as well, causing the fragments to accelerate radially outwards from the blast to further cause damage to the target. A proper design of shape-charged canister 132 may facilitate fragmentation and increase damage to the target.

Figure 7B:
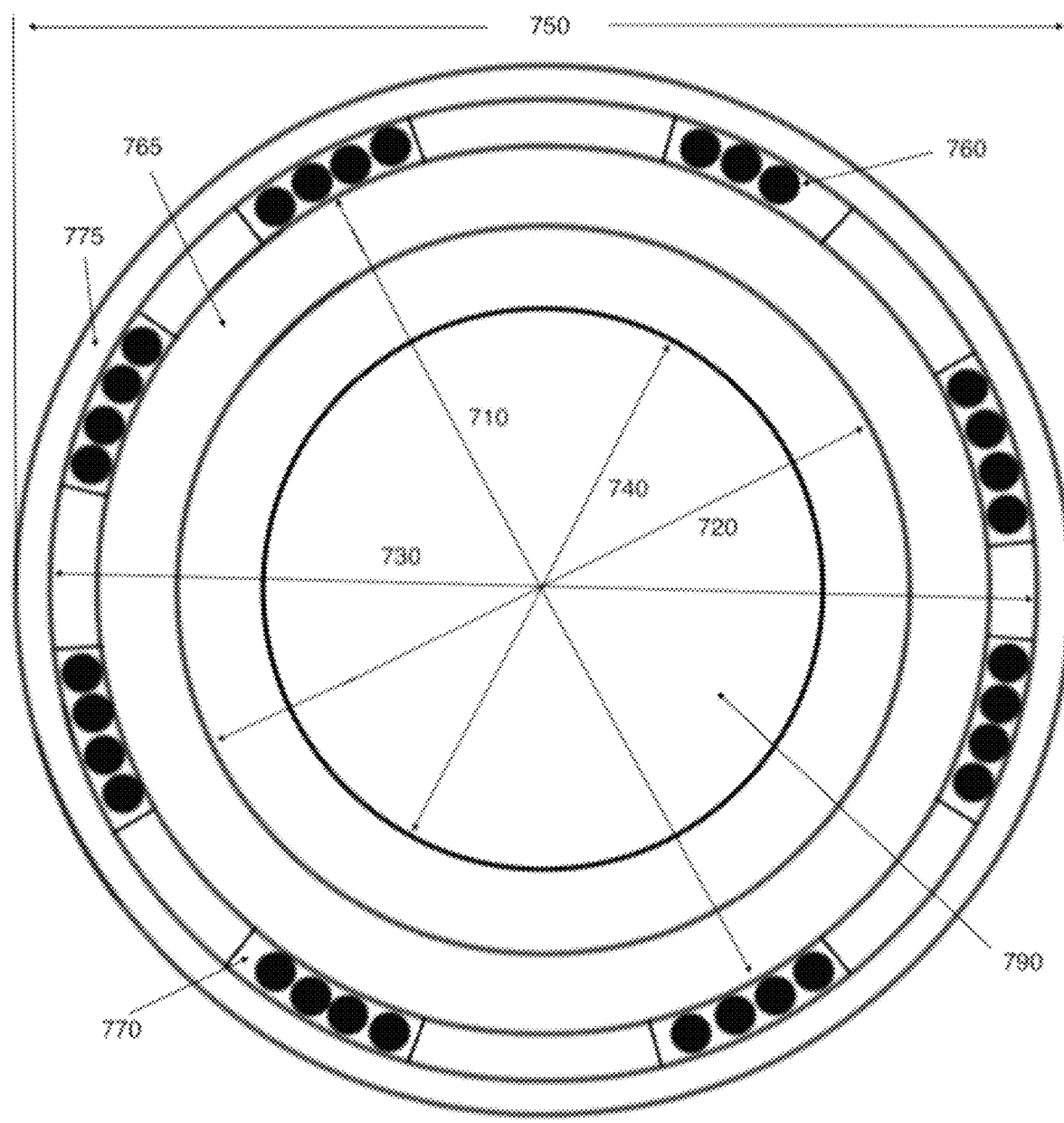
FIG. 7B illustrates a bottom view of an exemplary embodiment of a generally cylindrical payload container having a helical or spiral space configured between an inner and outer casing of the payload container and, further, having ball bearings filled within the helical or spiral space.
Figure 8:
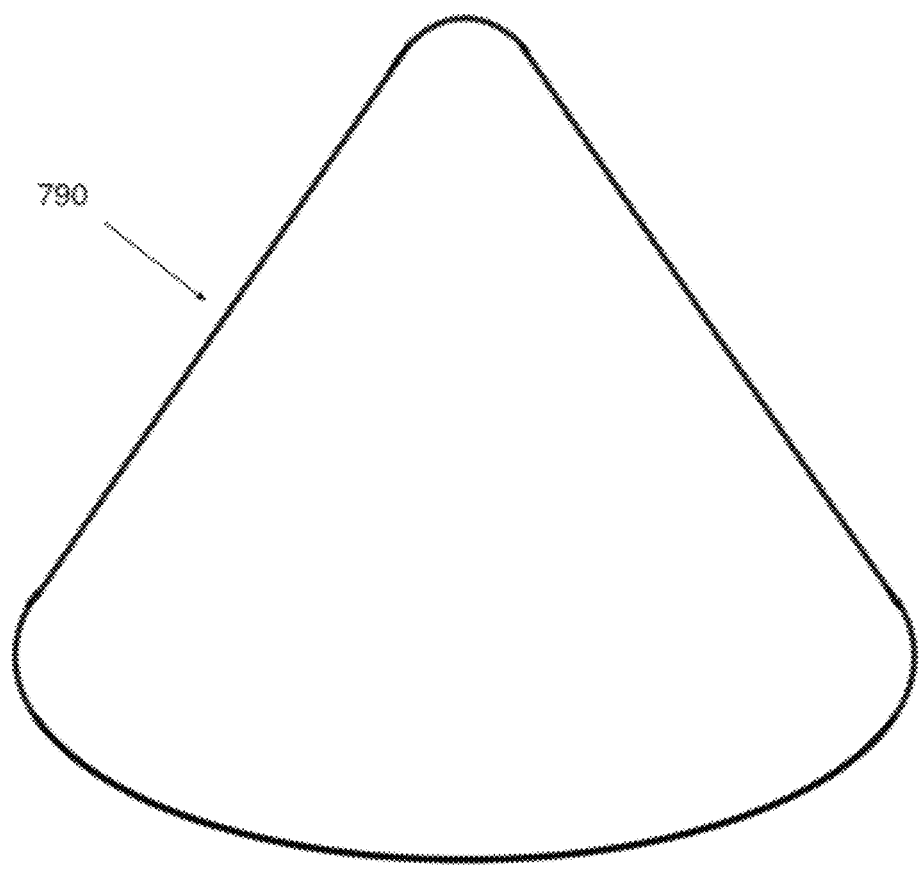
FIG. 8 illustrates an exemplary embodiment of a shaped-charge installed at one end of a payload container.

FIG. 7B shows a bottom view of payload container 130 of FIG. 7A. It also illustrates one exemplary design of shape-charged canister 132 that facilitates fragmentation and damage to a target. As shown, the outer shell of shape-charged canister 132 comprises an inner 765 and outer casing 775. Inner casing 765 is defined by inner diameter 720 and outer diameter 710. The outer casing 775 is defined by inner diameter 730 and outer diameter 750. Between the inner casing 765 and outer casing 775, one or more slots 770 are formed within the material between the inner 765 and outer casing 775. As shown in FIG. 7A, the slots 770 may be helical, or spiral-shaped, and contain loosely attached steel materials 760, such as ball bearings. The ball bearings 760 shown therein may each have a diameter of 0.25 inches, though it may be other sizes, and can be poured into slots 770 from openings (not shown) on top of canister 132 for quick loading.

Outer casing 775 may comprise a lightweight and easily fragmentable material, such as a plastic or thermoplastic, including a plastic or thermoplastic used in 3-D printing. Inner casing 765 may comprise a stronger or heavier plastic or thermoplastic material than the outer casing 775 but still comprise a material more easily fragmentable than, for example, metal. In between the casings, a material, including a plastic or thermoplastic material commonly used in 3-D printing, can be formed into the aforementioned slots 770. The slots 770 may then be filled with loosely attached steel materials 760, such as ball bearings, as discussed above. The loosely attached steel materials 760 provide the mass necessary to cause damage to a target once the payload container 130 explodes and the explosion pushes the steel materials 760 radially outward towards the target. As known by one of ordinary skill in the art, an outer casing 775 made of metal rather than plastic or thermoplastic takes more energy to fragment and accelerate outwards, though it will better control the upward or downward blast pressure for fragmenting and accelerating the copper cone 790 or other shaped-charge. Moreover, metal is generally heavier and takes a greater proportion of a drone's lifting capability to carry it to its target. Thus, the combination of an inner and outer casing made of plastic or thermoplastic, along with a configured space in between that carries loosely attached steel materials 760, such as ball bearings, allows for a design that can balance the weight of a payload container with its destructive force due to the blast.

For example, slots 770 carrying ball bearings, for example, may be configured to utilize on or about 90% of the space in between the inner 765 and outer casings 775 or only on or about 20%. The overall weight and destructive force of payload container 130 will vary, accordingly. Having the ability to adjust such factors allows the munitions payload system to be configured for almost any drone and any target, as a drone's lifting capability, operational distance, and target armor will vary. Moreover, because slots 770 are helical and spiral around the payload container's 130 periphery in a controllable uniform fashion, that helps the steel material 760 inside the slots 770 balance during flight and blast radially outwards in every direction. Moreover, because the steel material 760 is loosely connected, lesser blast force is needed to fragment the material. In one embodiment, most of the blast force will be used to accelerate the steel material 760 to a desired, destructive speed. While the steel material 760 is described as being made of steel, this is only an embodiment, as any attached material capable of causing sufficient damage to a target may still be used and steel is not a requirement for the invention.

Figure 9:
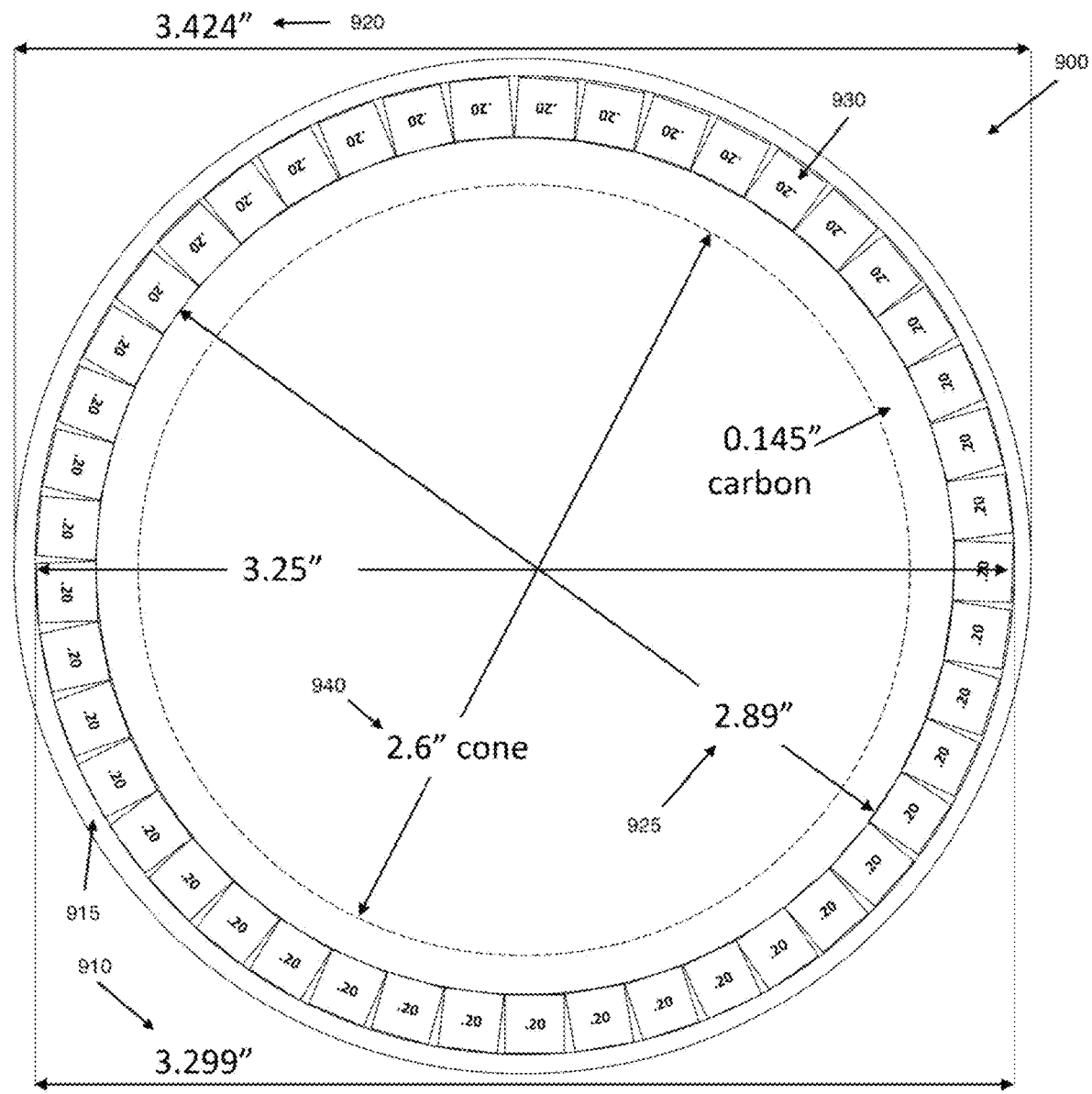

FIG. 9 illustrates another exemplary design of payload container 130. FIG. 9 shows a different bottom view 900 of payload container 130 of FIG. 7A for illustrative purposes. The dimensions of the inner 765 and outer 775 casings may change based on the design criteria, as shown in FIG. 9 (compare 910, 920, 925, and 940, for example, with the inner and outer diameters in FIG. 7B). Greater diameters for the casings mean the shaped-charged canister 132 will typically have greater volume, thus allowing for more explosive material inside, but may also increase the overall weight of the payload container 130, as well.

In FIG. 9, steel cubes 930 of 0.2 inches per side replace the ball bearings, for example, of FIGS. 7A&B as the steel material 760 loaded inside the helical slots 770 of FIG. 7A. The size and length of helical slots 770 (FIG. 7A) and the dimensions of the steel cubes 930 determine how many steel cubes 930 payload container 130 may contain and, consequently, how much weight and destructive force payload container 130 may ultimately comprise. One of ordinary skill in the art will understand the design trade-offs.

In one embodiment, in order to maximize the blast acceleration of the steel materials 760 (i.e., the ball bearings or steel cubes or other materials) loaded inside slots 770, the inner casing 765 can be made of a stronger plastic material than the outer casing 775. That way, when payload container 130 is detonated and an explosion takes place, the outer casing 775 will likely fragment first, being made from a more fragmentable material than the inner casing 765, and the inner casing 765 likely will correspondingly maintain its structural integrity for a longer period of time. The longer period of time can allow the inner casing 765 to push the steel materials 760 (or 930) radially outwards with less resistance from the outer casing 775, thereby, more easily accelerating the steel materials 760 or 930 to a desired speed, the speed where maximum damage may be achieved.

The material in between inner casing 765 and outer casing 775 from which slots 770 are formed preferably will be the same material used for making the outer casing 775; however, any material that is lighter and/or more fragmentable than the inner casing 765 (or even the same material as the inner casing 765) can be used with the predicted effects.

As discussed above, the material may be made of plastic or thermoplastic, including plastic and thermoplastic commonly used in 3-D printing. Consequently, payload container 130 may be manufactured using 3-D printing. Moreover, helical or spiral-shaped slots 770 are exemplary and any size or shaped slots may be used without departing from the invention. Further, an express statement of one or more parts that can be made from 3-D printing does not mean that other parts are not manufactured using 3-D printing.

While exemplary embodiments have been described in this disclosure, one of ordinary skill in the art knows that mixing and matching the features described herein create other embodiments not expressly disclosed. This disclosure is not limited to the embodiments described herein.

We claim:

1. A munitions payload delivery system comprising:
    a drone;
    a payload container attached to the drone and configured to hold weapons-grade explosives; and
    a bump-rod configured to extend outward from the drone to engage a target and to ignite a blasting cap in the payload container after the bump-rod makes contact with the target.

2. The munitions payload delivery system of claim 1 wherein the length of the bump-rod is configured to produce a standoff distance between the drone and the target that allows fragmented material produced from an explosion inside the payload container to achieve maximum velocity before the fragmented material strikes the target.

3. The munitions payload delivery system of claim 1 wherein the payload container is configured as a linear-shaped charge.

4. The munitions payload delivery system of claim 1 wherein the payload container is configured as an armor piercing munition.

5. The munitions payload delivery system of claim 1 further comprising a camera configured to send a video feed to an operator of the drone.

6. The munitions payload delivery system of claim 5 wherein the drone is capable of being operated by the operator a safe distance away from a battlefield.

7. The munitions payload delivery system of claim 6 wherein the payload container is further configured to hold both a shaped charge and a wide area fragmentation pattern charge.

8. The munitions payload delivery system of claim 1 wherein the payload container is manufactured using three-dimensional (3-D) printed plastic material.

9. The munitions payload delivery system of claim 1 wherein the bump-rod is configured as part of the drone's landing gear.

10. The munitions payload delivery system of claim 1 wherein the payload container attaches to a frame of the drone with at least one spring-loaded latch for quick assembly.

11. The munitions payload delivery system of claim 1 having a control circuit for controlling application of a blasting signal sent to the blasting cap, the control circuit comprising at least one radio arm switch and at least one manual arm switch, wherein the radio arm switch is configured to be activated after power is applied to the drone.

12. The munitions payload delivery system of claim 11 wherein the control circuit comprises a test port for testing the power supplied to the blasting cap prior to an operator activating the manual arm switch.

13. The munitions payload delivery system of claim 12 wherein the control circuit includes a radio fire switch that, when activated by the operator, causes the blasting signal to reach the blasting cap.

14. The munitions payload delivery system of claim 1 wherein the payload container comprises:
   an outer casing;
   an inner casing; and
   spacing formed between the outer casing and the inner casing, the spacing configured to hold fragmented materials in a uniform manner around a central axis of the casings.

15. The munitions payload delivery system of claim 14 wherein at least a portion of the payload container is made from three-dimensional printed material.

16. The munitions payload delivery system of claim 14 wherein the spacing is filled with fragmented material.

17. The munitions payload delivery system of claim 16 wherein the fragmented material comprises ball bearings.

18. The munitions payload delivery system of claim 14 wherein the spacing is configured as at least one helix that spirals around the central axis of the casings and is configured to be filled with the fragmented materials through a top or bottom surface of the payload container.

19. A munitions payload delivery system comprising:
   a drone;
   a payload container attached to the drone, the payload container configured to hold weapons-grade explosives for disabling heavily armored military vehicles when ignited; and
   a control circuit configured to ignite one or more blasting caps inside the payload container for igniting the weapons-grade explosives when at least one of the following switches connected to the control circuit activates a blasting signal connected to the one or more blasting caps:
      a bump-rod switch attached to a bump-rod that extends outward from the drone to engage a target, the switch configured to activate the blasting signal when the bump-rod makes contact with the target;
      a landing gear switch connected to one or more feet of the landing gear of the drone, the landing gear switch configured to activate the blasting signal when the landing gear lands on the target; and
      a radio fire switch configured to activate the blasting signal when the operator of the drone activates the radio fire switch using a remote controller of the drone.

* * * * *